(12) United States Patent
Picand et al.

(10) Patent No.: US 10,001,404 B2
(45) Date of Patent: Jun. 19, 2018

(54) METHOD AND SYSTEM FOR MONITORING SUB-SYNCHRONOUS TORSIONAL OSCILLATIONS OF A SHAFT LINE OF A STEAM TURBINE

(71) Applicant: ALSTOM Technology Ltd, Baden (CH)

(72) Inventors: Sébastien Picand, Levallois-Perret (FR); Martin Toulemonde, Paris (FR); Boris Huart, Paris (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 244 days.

(21) Appl. No.: 14/807,296

(22) Filed: Jul. 23, 2015

(65) Prior Publication Data

US 2016/0033321 A1 Feb. 4, 2016

(30) Foreign Application Priority Data

Jul. 31, 2014 (EP) .................................... 14179219

(51) Int. Cl.
| | | |
|---|---|---|
| *G01H 1/00* | (2006.01) | |
| *F01D 21/00* | (2006.01) | |
| *F01D 21/14* | (2006.01) | |
| *G01H 1/10* | (2006.01) | |
| *F01D 5/10* | (2006.01) | |

(52) U.S. Cl.
CPC ........... *G01H 1/006* (2013.01); *F01D 21/003* (2013.01); *F01D 21/14* (2013.01); *G01H 1/10* (2013.01); *F01D 5/10* (2013.01); *F05D 2220/31* (2013.01); *F05D 2270/334* (2013.01)

(58) Field of Classification Search
CPC ........ G01H 1/006; G01H 1/10; F01D 21/003; F01D 21/14; F01D 5/10; F05D 2220/31; F05D 2270/334
USPC .................................................... 73/659, 660
See application file for complete search history.

(56) References Cited

U.S. PATENT DOCUMENTS

| | | | |
|---|---|---|---|
| 3,885,420 A | 5/1975 | Wolfinger | |
| 4,148,222 A | 4/1979 | Wolfinger | |
| 4,267,734 A | 5/1981 | Shima et al. | |
| 5,144,840 A * | 9/1992 | Whipple, III | .......... G01H 1/003 |
| | | | 73/660 |

(Continued)

FOREIGN PATENT DOCUMENTS

| | | |
|---|---|---|
| CN | 103 245 913 A | 8/2013 |
| WO | 95/27183 A1 | 10/1995 |

*Primary Examiner* — Manish S Shah
*Assistant Examiner* — Suman K Nath
(74) *Attorney, Agent, or Firm* — GE Global Patent Operation; Cynthia W. Flanigan

(57) ABSTRACT

A method for monitoring sub-synchronous torsional oscillations of a shaft line of a steam turbine includes measuring a rotational speed of the shaft line over a period of time and generating, from the measured rotational speed, a signal representative of the rotational speed over the period of time. The method further includes performing a spectrum analysis on the signal to determine, for at least one given frequency, an amplitude of variation of the rotational speed at the given frequency, comparing the amplitude with at least one predetermined amplitude threshold for the frequency, and generating an alert signal if the amplitude exceeds at least one predetermined amplitude threshold.

15 Claims, 1 Drawing Sheet

(56) References Cited

U.S. PATENT DOCUMENTS

| | | | | |
|---|---|---|---|---|
| 5,365,787 A | * | 11/1994 | Hernandez | G01H 1/003 324/207.25 |
| 5,955,674 A | * | 9/1999 | McGovern | G01H 1/10 701/111 |
| 7,770,458 B2 | * | 8/2010 | Blanchard | G01M 13/045 702/56 |
| 8,042,412 B2 | | 10/2011 | Xia et al. | |
| 2005/0183504 A1 | | 8/2005 | Hobelsberger | |
| 2015/0377059 A1 | * | 12/2015 | Debbouz | F01D 19/00 60/776 |

* cited by examiner

METHOD AND SYSTEM FOR MONITORING SUB-SYNCHRONOUS TORSIONAL OSCILLATIONS OF A SHAFT LINE OF A STEAM TURBINE

CROSS-REFERENCE TO RELATED APPLICATIONS

This application claims priority to EP Application No. 14179219.2 filed Jul. 31, 2014, the contents of which are hereby incorporated in its entirety.

TECHNICAL FIELD

The present invention relates to a method for monitoring sub-synchronous torsional oscillations of a shaft line of a steam turbine.

This invention relates more specifically to electricity power generating systems comprising a shaft line in which torsional oscillations at sub-synchronous resonance frequencies may be a problem.

BACKGROUND OF THE INVENTION

Electrical generators are often driven from power sources such as steam turbines. Steam turbines generally include a shaft line comprising several turbine stages and a generator, forming a complex system.

In normal operation, the shaft line rotates at a given synchronous frequency, for example 25 Hz, 30 Hz, 50 Hz or 60 Hz.

However, when rotating, the shaft line may also be subjected to torsional oscillations. These torsional oscillations may result from disturbances internal to the generator or from disturbances external to the generator along the electrical system supplied by the generator.

Such torsional oscillations may in particular appear when the generator is used for the delivery of energy to a grid network through long capacitive power transmission lines poorly interconnected. Indeed, when long transmission lines are required for the delivery of energy to a grid network, series capacitive compensation is generally used to reduce the angular deviation and the voltage drop, and thus increase the stability of the line. However, the compensating capacitors result in the presence of certain resonant frequencies in the grid network, which may cause torsional oscillations of the shaft line.

Torsional oscillations induce a variation in the speed of the shaft line proportional to the torsion angle of the shaft line. Torsional oscillations thus result in a non-uniform rotation frequency along the shaft line.

In certain conditions, when the electrical resonance (as grid electrical resonance) cooperates with a resonance frequency of the shaft line, resonant torsional oscillations may occur. The resonant torsional oscillations occur at resonance frequencies which are lower than the synchronous frequency of the shaft line, and are thus called sub synchronous resonances.

Torsional oscillations cause torsional stresses at critical locations along the shaft line which may damage the shaft line, and in some instances may even result in the breakage of the shaft line.

In order to solve this problem, it has been proposed to monitor the strain on the shaft line by means of strain gauges placed on the shaft. However, this solution has low reliability over time and may only be used for punctual assessments, and not for permanent monitoring of the shaft.

It has thus been proposed in US 2005/0183504 A1 to monitor the strain on the shaft line in an indirect manner, for example by analyzing the power supplied to the network grid in order to evaluate the torsional oscillations of the shaft line. However, this method implies the use of extra devices to measure the power supplied.

It is therefore an object of the invention to provide a system and a method for monitoring the torsional oscillations on a shaft line which has a sufficient accuracy and can be simply implemented on an existing shaft line, in a cost effective manner.

SUMMARY OF THE INVENTION

To that end, the invention relates to a method for monitoring sub-synchronous torsional oscillations of a shaft line of a steam turbine, said method comprising the steps of:
measuring a rotational speed of said shaft line over a period of time and generating, from the measured rotational speed, a signal representative of said rotational speed over said period of time,
performing a spectrum analysis on said signal to determine, for at least one given frequency, an amplitude of variation of said rotational speed at said given frequency,
comparing said amplitude with at least one predetermined amplitude threshold for said frequency,
generating an alert signal if said amplitude exceeds at least one predetermined amplitude threshold.

According to other advantageous aspects of the invention, the method comprises one or more of the following features, considered alone or according to any technically possible combination:
the step of performing a spectrum analysis comprises determining, for each of a plurality of frequencies, an amplitude of variation of said rotational speed at said frequency, the comparing step comprises a comparison of the amplitude determined for each frequency with at least one predetermined amplitude threshold for said frequency, and the generating step comprises generating an alert signal if at least one amplitude determined for a frequency exceeds at least one of said predetermined amplitude thresholds for said frequency;
said or each given frequency is a sub-synchronous oscillation resonance frequency of the shaft line;
the comparing step comprises comparing, for said or each frequency, said amplitude with a lower and a higher predetermined amplitude thresholds for said frequency;
the generating step comprises generating an alert signal of a first type if said amplitude is higher than the lower amplitude threshold and lower than the higher amplitude threshold;
said steam turbine rotates a generator, and the method further comprises a step of reducing a power generated by the generator after an alert signal of the first type is generated;
the generating step comprises generating an alert signal of a second type, different from said first type, if said amplitude is higher than the higher amplitude threshold;
the method further comprises a tripping of said steam turbine after an alert signal of the second type is generated;
the measuring step comprises measuring a rotational speed of said shaft line at a plurality of measurement times over said period of time;

the measuring step comprises, at each measurement time, a measure, by a sensor, of a mean rotational speed of said shaft line on a given measurement period preceding said measurement time;

the measure by the sensor comprises a detection of a movement of a toothed wheel mounted on said shaft line during said given measurement period;

said sensor is a non-contact sensor;

the spectrum analysis performing step comprises applying a Fast Fourier Transform (FFT) to said signal.

The invention also relates to a system for monitoring sub-synchronous torsional oscillations of a shaft line of a steam turbine, said system comprising:

a speed measurement device configured to measure a rotational speed of said shaft line over a period of time, and to generate, from the measured rotational speed, speed values forming a signal representative of said rotational speed over said period of time, an analysis unit configured to perform a spectrum analysis on said signal and to determine, for at least one given frequency, an amplitude of variation of said rotational speed at said given frequency, said analysis unit being further configured to compare said amplitude with at least one predetermined amplitude threshold for said frequency, and to generate an alert signal if said amplitude exceeds at least one predetermined amplitude threshold.

According to another advantageous aspect of the invention, said speed measurement device comprises at least one speed sensor.

BRIEF DESCRIPTION OF THE DRAWINGS

The invention shall subsequently be explained in more detail based on exemplary embodiments in conjunction with the drawings. In the drawings.

DETAILED DESCRIPTION OF DIFFERENT EMBODIMENTS OF THE INVENTION

Figure 1:
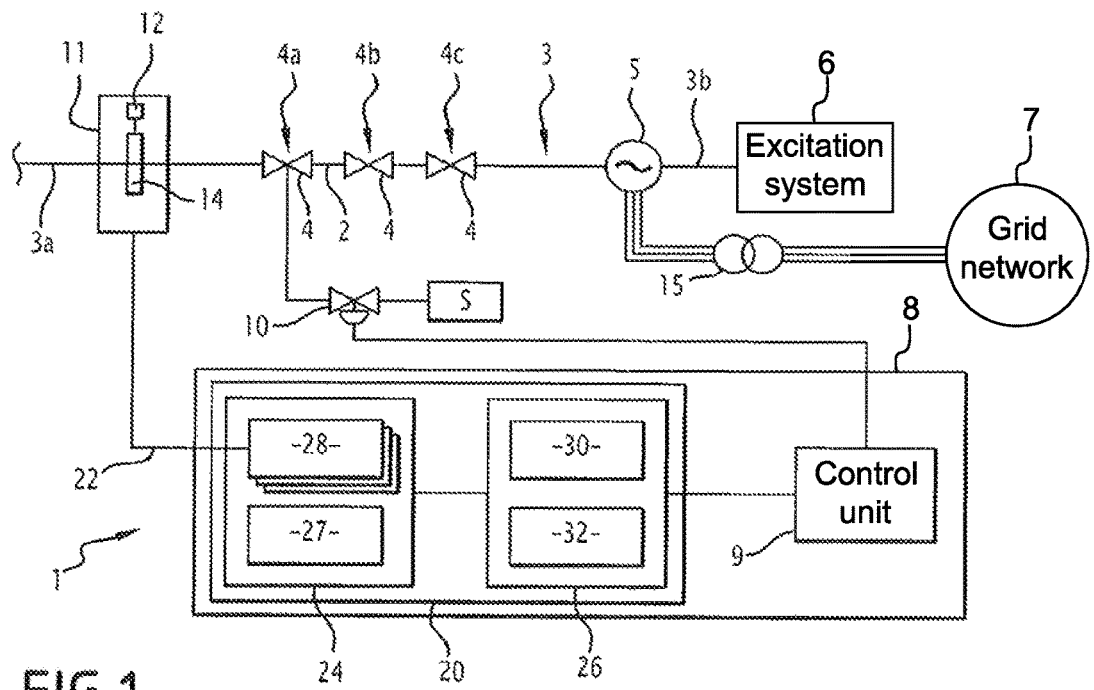
FIG. 1 is a schematic representation of a system according to the invention, for monitoring torsional oscillations of a shaft line of a steam turbine.

FIG. 1 shows a system 1 for monitoring torsional oscillations of a shaft line 2 of a steam turbine 3 according to an embodiment of the invention.

The steam turbine 3 is for example a nuclear steam turbine.

The shaft line 2 extends between a front extremity 3a and a rear extremity 3b. The shaft line 2 comprises from the front to the rear extremity, several stages 4, for example a high-pressure stage 4a, an intermediate pressure stage 4b, and a low-pressure stage 4c, a generator 5 and an excitation system 6. The excitation system is destined to supply magnetizing current (or "excitation") to the generator field.

The generator 5 is used for the delivery of energy to a grid network 7 through transmission lines, including a voltage transformer 15.

The functioning of the steam turbine 3 is controlled by a control center 8. The control center 8 is adapted to control the power generated by the generator 5 and to command the stopping of the steam turbine 3. In particular, the control center 8 includes a control unit 9 adapted to send a signal to a valve 10 to control the amount of steam S supplied to the turbine.

In normal operation, the shaft line 2 rotates at a given synchronous frequency $f_{shaft}$ which depends on the supply frequency (for example 50 Hz or 60 Hz) and on the number of poles of the generator 5. For a supply frequency of 50 Hz, the synchronous frequency $f_{shaft}$ of the shaft line 2 is thus for example equal to 25 Hz with a 4-pole generator (corresponding to a rotational rate of 1500 rpm) or to 50 Hz with a 2-pole generator (corresponding to a rotational rate of 3000 rpm).

The shaft line 2 is associated to sub-synchronous torsional resonance frequencies, i.e. frequencies at which, when submitted to torsional oscillations, the shaft line 2 may go into resonance. These sub-synchronous torsional resonance frequencies, noted $fr_i$, are below the synchronous frequency $f_{shaft}$ of the shaft line 2.

The system 1 comprises a speed measurement device 11 for measuring a rotational speed of the shaft line 2 and supplying a speed value representative of the measured speed, and an analysis unit 20 for detecting, from speed values thus supplied, the amplitude of the torsional oscillations of the shaft line 2.

In particular, the speed measurement device 11 is configured to measure the rotational speed of the shaft line 2 at measurement times $t_m$, with a measurement frequency $f_m$, and to provide a speed value representative of the measured speed at each measurement time $t_m$.

The speed measurement device 11 comprises one or several sensors 12 for measuring the rotational speed of the shaft 2.

Sensors 12 are non-contact sensors, able to detect and measure the rotation of a toothed wheel 14 mounted on the shaft 2. For example, sensors 12 are Hall effect sensors.

Each sensor 12 is able to detect a movement of the toothed wheel 14 during a given measurement period $T_m$, and to provide electrical pulses having a frequency proportional to the measured speed. The speed measurement device 11 is thus able to measure, from the electrical pulses, an average rotational speed of the shaft 2 during the measurement period $T_m$.

The tooth wheel 14 is for example mounted on the shaft line 2 at its front extremity. This position of the tooth wheel 14 ensures that the tooth wheel 14 is not placed at a node of a torsional oscillation, i.e. a position on the shaft line 2 where the amplitude of this torsional oscillation is null. Thus, this position of the tooth wheel 14 ensures that variations in the rotational speed of the shaft line 2 will be detected.

The speed measurement device 11 is configured to store the speed values thus determined.

The analysis unit 20 is configured to extract speed values from the speed measurement device 11, and to analyze the speed values, forming a speed signal, to determine, by performing a spectrum analysis on the speed signal, the amplitude of the torsional oscillations of the shaft.

In particular, the analysis unit 20 is configured to check the speed measurement device 11, at acquisition times $t_s$, with an acquisition frequency $f_s$, so as to extract, at each acquisition times $t_s$, the last speed value determined by the speed measurement device 11. Thus, the measurement frequency $f_m$ is preferably higher than the acquisition frequency $f_s$.

The choice of the acquisition frequency $f_s$ depends on the highest frequency to be detected in the electrical signal. Indeed, the highest frequency which can be detected from a signal sampled at an acquisition frequency $f_s$ is $f_s/2$.

For example, if the shaft line synchronous frequency $f_{shaft}$ is 25 Hz, the acquisition frequency $f_s$ should be at least 50 Hz in order to allow the detection of sub-synchronous frequencies up to 25 Hz.

The acquisition frequency $f_s$ is also chosen as a function of the frequency resolution $\Delta f$ required for determining the amplitude of the torsional oscillations at the sub synchronous torsional resonance frequencies $fr_i$, as described in further details below.

The analysis unit 20 is connected to the speed measurement device 11, by means of a physical or a wireless connection 22.

The analysis unit 20 is preferably included in the control center 8.

The analysis unit 20 comprises a memory 24 and a processor 26.

The memory 24 comprises a first zone 27 for storing the values of the sub synchronous torsional resonance frequencies $fr_i$ of the shaft line 2 and, for each of the frequencies $fr_i$, two amplitude thresholds noted $A_{i1}$ and $A_{i2}$ respectively.

The sub synchronous torsional resonance frequencies $fr_i$ of the shaft line 2 are predetermined, for example by means of experiments or simulations.

The amplitude thresholds $A_{i1}$ and $A_{i2}$ are predetermined thresholds for the amplitude of torsional oscillations at resonance frequency $fr_i$.

Each amplitude threshold is associated with a specific action which should be taken if the amplitude of torsional oscillations at frequency $fr_i$ is higher than this threshold.

For example, the lower threshold $A_{i1}$ is the amplitude of torsional oscillations at frequency $fr_i$ over which an alarm signal shall be generated, and the higher threshold $A_{i2}$ is the amplitude of torsional oscillations at frequency $fr_i$ over which a trip signal shall be generated.

The threshold $A_{i1}$ is for example equal to 1 rpm for each frequency $f_{ri}$ for a steam turbine with a rotational rate of 1,500 rpm. This threshold corresponds to the amplitude of torsional oscillations above which the shaft line may be damaged.

The threshold $A_{i2}$ is for example equal to 2 rpm for each frequency $f_{ri}$ for a steam turbine with a rotational rate of 1,500 rpm. This threshold corresponds to the amplitude of torsional oscillations above which a breakage of the shaft line 2 could occur.

The memory 24 further comprises a second zone for storing the speed values extracted from the speed measurement device 11. The second zone, hereinafter called buffer memory 28, is configured to store a series of samples, each sample comprising an acquisition time $t_s$ and the speed of the shaft line as received from the speed measurement device 11 at this acquisition time $t_s$. The processor 26 comprises an analyzing module 30 and a decision module 32.

The analyzing module 30 is configured to analyze the speed values, stored in the memory 24, forming a speed signal, over a sampling period $T_0$ to determine, by performing a spectrum analysis on the speed signal on this sampling period $T_0$, the amplitude of the torsional oscillations of the shaft line 2.

In particular, the analyzing module 30 is configured to perform this analysis at analysis times $t_a$, with an analysis rate $f_a$. The analysis rate $f_a$ is for example equal to the acquisition frequency $f_s$.

To this end, at each analyzing time $t_a$, the analyzing module 30 is configured to extract a set of N samples from the memory 24, such that $$T_0 = \frac{N}{f_s}.$$

The N samples correspond to the last N speed values extracted from the speed measurement device 10 and stored in the buffer memory 28.

The N speed signals are representative of the variation in time of the shaft line speed over the sampling period $T_0$.

Variations in the shaft line speed occurring at the sub-synchronous torsional resonance frequencies $fr_i$ correspond to torsional oscillations of the shaft line 2.

The number N of samples, and thus the sampling period $T_0$, are for example chosen as a function of the lowest resonance frequencies $fr_i$ to be detected and of the frequency resolution $\Delta f$ required for determining the amplitude of the torsional oscillations at the sub synchronous torsional resonance frequencies $fr_i$.

Indeed, for a given acquisition frequency fs and a given number of samples N, corresponding to a sampling period $$T_0 = \frac{N}{f_s},$$

the lowest frequency that can be detected by spectrum analysis is $$\frac{1}{T_0} = \frac{f_s}{N}.$$

Moreover, for a given acquisition frequency $f_s$, the highest frequency resolution which can be obtained is $$\Delta f = \frac{f_s}{N}.$$

This means that a spectrum analysis performed on the N samples will lead to the determination of the amplitude of variation of the speed of the shaft line 2 at detected frequencies $$f_{di} = i * \frac{f_s}{N}$$

with i from 1 to N/2.

Thus, N is for example chosen high enough so that $$\frac{f_s}{N}$$

is lower than the lowest resonance frequency of the shaft line 2.

Moreover, the number N of samples is preferably chosen high enough so that the frequency resolution $\Delta f$ is at least equal to the accuracy of the sub-synchronous torsional resonance frequencies $fr_i$ as stored in the memory 24, so that each sub-synchronous torsional resonance frequencies $fr_i$ is equal to one of the detected frequency $fd_i$.

For example, with an acquisition frequency $f_s$ of 50 Hz, corresponding to a speed measurement each 20 ms, a number of samples N=100 allows the detection of frequencies $f_{di}=i*0.5$, with i from 1 to 50, which allows the detection of frequencies as low as 0.5 Hz, and with a frequency resolution of 0.5 Hz.

However, number N of samples may alternatively be chosen lower, i.e. so that $$\frac{f_s}{N}$$

is higher than the lowest resonance frequency of the shaft line 2 and/or the frequency resolution $\Delta f$ is lower than the accuracy of the sub-synchronous torsional resonance frequencies $fr_i$. In this case, the zero-padding procedure may be applied, by adding a number Nz of zero-values samples so that that $$\frac{f_s}{N+N_Z}$$

is lower than the lowest resonance frequency of the shaft line 2 and at least equal to the accuracy of the sub-synchronous torsional resonance frequencies $fr_i$. The use of zero-padding therefore allows obtaining a higher resolution that the resolution that would be obtained with N samples, and thus increasing the frequency resolution for a given sampling period and a given acquisition frequency.

The N samples form a discrete signal representative of the variation of the speed of the shaft line 2 over the sampling period $T_0$.

The analyzing module 30 is configured to analyze the variations of the rotational speed of the shaft line 2 over the sampling time $T_0$ by performing a spectrum analysis on this signal.

In particular, the analyzing module 30 is configured to determine a frequency spectrum of the variation of the shaft line rotational speed over the sampling time $T_0$. The frequency spectrum comprises, for each detected frequency $f_{di}$ such that $f_{di}=i*\Delta f$, with i from 1 to N/2, the amplitude $A_{di}$ of the variation of the rotational speed at this frequency.

Preferably, the analyzing module 30 is configured to apply one or more pre-analysis treatments to the set of N samples before the spectrum analysis is performed.

For example, these pre-analysis treatments include a substraction, from each of the samples, of a mean value of rotational speed over the set of N samples, so as to remove the DC component from the signal. The mean value is for example the mean value of the rotational speed over the set of N samples, or over a subset of samples.

These pre-analysis treatments may further include a low pass filter stage, in order to remove from the signal the frequencies higher than the sub synchronous torsional resonance frequencies $fr_i$. Thus, the cut-off frequency of the low pass filter is for example chosen as equal to the synchronous frequency $f_{shaft}$ of the shaft line 2.

These pre-analysis treatments may further include a windowing stage, comprising the application of a window function on the signal, for example a Hamming window or a Hann window. The windowing stage is intended to reduce the occurrence of spectral leakage and to reduce the scalloping loss.

Finally, the pre-analysis treatments may comprise zero-padding, if necessary.

The spectrum analysis is for example performed by applying a Fast Fourier Transform (FFT) on the set of N samples (or $N+N_Z$ samples, if zero-padding is used), after the application of the pre-analysis treatments mentioned above. The decision module 32 is configured to receive from the analyzing module 30, at each analyzing time $t_a$, the frequency spectrum of the variation of the rotational speed of the shaft line 2.

Furthermore, the decision module 32 is configured to extract from the first zone 27 of the memory 24 the values of the sub-synchronous torsional resonance frequencies $fr_i$ of the shaft line 2 and, the two amplitude thresholds $A_{i1}$ and $A_{i2}$ associated to each of the resonance frequencies $fr_i$.

For each sub-synchronous torsional resonance frequency $fr_i$, the decision module 32 is configured to extract, from the frequency spectrum, the amplitude Ai of the variation of the rotational speed of the shaft line 2 at this resonance frequency $fr_i$ or at the closest frequency in the spectrum, i.e. the frequency $fd_i$ such that $|fd_i-fr_i|<\Delta f$.

However, if the frequency resolution $\Delta f$ is at least equal to the accuracy of the sub-synchronous torsional resonance frequencies $fr_i$, each sub synchronous torsional resonance frequencies $fr_i$ is equal to one of the detected frequency $fd_i$.

The decision module 32 is further configured to compare, for each torsional resonance frequency $fr_i$, the amplitude $A_i$ to the associated thresholds $A_{i1}$ and $A_{i2}$, and to generate an alert signal if at least one of the amplitudes $A_i$ overpasses at least one of the thresholds $A_{i1}$ and $A_{i2}$.

This alert signal depends on whether one or the two thresholds are overpassed.

If at least one amplitude $A_i$ is higher than the corresponding lower threshold $A_{i1}$ but lower than the higher threshold $A_{i2}$, the decision module 32 is configured to generate and send an alarm signal to the control unit 9 to trigger a reduction in the power of the generator 5, by partially closing the valve 10. Indeed, this reduction may lead to a decoupling between the electrical resonance in the grid network 7 and the frequency $fr_i$, which may thus result in a decrease over time of the amplitude $A_i$. This reduction is for example a reduction of 50% of the power of the generator 5.

However, this decrease, if it occurs, is not instantaneous.

Thus, if an alarm signal was already sent to the control unit 9 within a predetermined period preceding $t_a$, the alarm signal sent at the acquisition time $t_a$ will not result in a reduction in the power of the generator 5.

If at least one amplitude $A_i$ overpasses the corresponding higher threshold $A_{i2}$, the decision module 32 is configured to send a trip signal to the control unit 9 to trigger a tripping of the steam turbine 3, by closing the valve 10.

Figure 2:
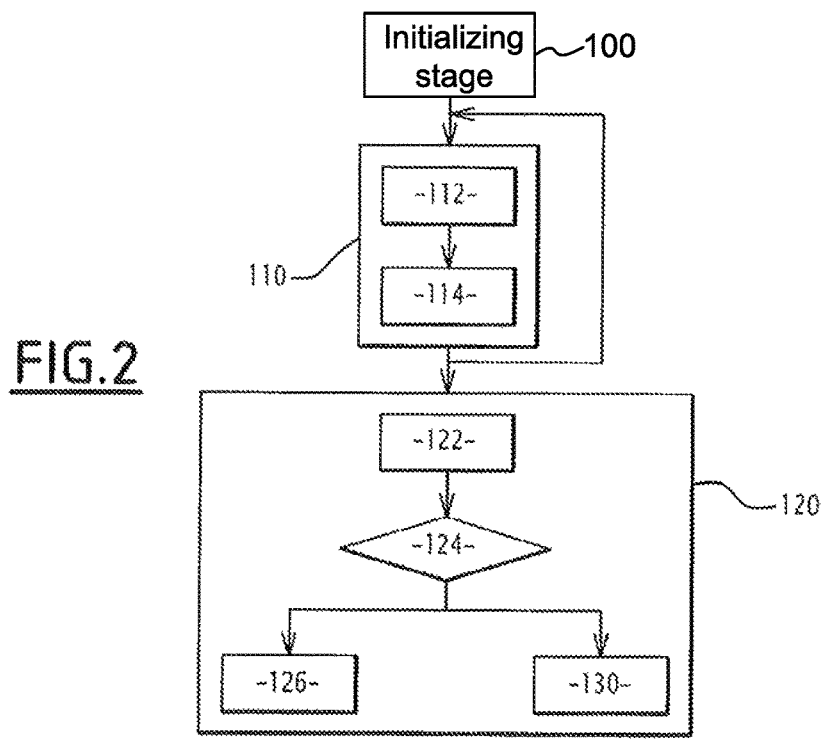
FIG. 2 is a block diagram of a method according to the invention implemented by the system of FIG. 1.

A method for monitoring sub-synchronous torsional oscillations in the shaft line 2, carried out by the system 1, will now be described with reference to FIG. 2.

The method comprises an initializing stage 100, comprising the storing of the values of the sub synchronous torsional resonance frequencies $fr_i$ of the shaft line 2 and the corresponding amplitude thresholds $A_{i1}$ and $A_{i2}$ in the first zone 27 of the memory 24. The initializing stage further comprises the configuration of the analyzing module 30 in order to set the parameters of the spectrum analysis to be performed, including the pre-analysis treatments to be applied.

The initializing stage 100 further comprises the choice of the acquisition frequency $f_s$, of the analysis rate $f_a$ and the sampling time $T_0$ (or, in an equivalent manner, the number N of samples) for the analyzing module 30.

The initializing stage 100 thus further comprises the configuration of the analyzing module 30 according to the chosen acquisition frequency $f_s$, analysis rate $f_a$ and sampling time $T_0$.

Then, a measurement stage 110 is performed by the speed measurement device 11.

During the measurement stage 110, the speed measurement device 11 measures a rotational speed of the shaft line 2 at a plurality of measurement times $t_m$, with a measurement frequency $f_m$, to provide speed values representative of the rotational speed of the shaft line 2 over a period of time, and thus representative of the variation of the rotational speed of the shaft line 2 over the period of time.

At each measurement time $t_m$, the speed measurement device 11 performs a step 112 of measure of the rotational speed of the shaft line 2.

Each measuring step 112 comprises the detection by sensor(s) 12 of the movement of the toothed wheel 14 during a measurement period $T_m$, and the measure, from this detected movement, of the average rotational speed of the toothed wheel 14 during the measurement period $T_m$.

The speed values thus determined are stored by the speed measurement device 11.

The measuring step 112 is performed iteratively at a plurality of measurement times $t_m$, with the measurement frequency $f_m$.

The acquisition stage 110 further comprises a step 114 of extraction by the analysis unit 20, at each acquisition time $t_s$, of the last speed value determined and stored by the speed measurement device 11, and of storing of this speed value in the buffer memory 28.

The method further comprises a monitoring stage 120.

Each monitoring stage 120 comprises an analysis step 122 in which the analyzing module 30 determines and analyses the variation of the measured speed of the shaft line 2 over the predefined sampling period $T_0$, by performing a spectrum analysis on this variation.

To this end, the analyzing module 30 extracts a set of N samples from the buffer memory 28, corresponding to the last N samples received from the speed measurement device 11. The N samples form a signal representative of the variation of the shaft line speed over the sampling period $T_0$.

The analyzing module 30 then performs a spectrum analysis of the signal formed by these N samples, and determines a frequency spectrum of the variation of the shaft line speed over the sampling time $T_0$.

The frequency spectrum thus determined comprises, for each frequency $f_{di}$ such that $f_{di}=i*\Delta f$, with i from 1 to N/2 (or $(N+N_Z)/2$, if zero-padding is used), the amplitude $A_{di}$ of the variation of the speed at this frequency.

The spectrum analysis is for example performed by the analyzing module 30 by applying one or more pre-analysis treatments, and by subsequently applying a Fast Fourier Transform (FFT) on the set of N (or $N+N_Z$) samples.

The analysis stage 120 is performed by the analysis unit 20 iteratively at a plurality of analysis times $t_a$, with an analyzing frequency $f_a$, as soon as the number of samples stored in the second zone 28 of the memory 24 reaches N.

Each monitoring stage 120 further comprises a comparing step 124. The comparing step 124 is performed by the decision module 32 to detect sub synchronous torsional oscillations with an amplitude higher than at least one of the corresponding amplitude thresholds, which allows taking actions to avoid a damage or even a breakage of the shaft line 2 which could result from these oscillations.

The comparing step 124 comprises the reception by the decision module 32 of the frequency spectrum of the variation of the shaft line speed determined by the analyzing module 30 at the analyzing moment $t_a$.

Then, for each sub synchronous torsional resonance frequency $fr_i$ of the shaft line 2 stored in the first zone 27 of the memory 24, the decision module 32 extracts, from the frequency spectrum, the amplitude $A_i$ of the variation of the shaft line speed at this resonance frequency $fr_i$ or at the closest frequency in the spectrum, i.e. the frequency $fd_i$ such that $|fd_i-fr_i|<\Delta f$.

Then, for each torsional resonance frequency $fr_i$, the decision module 32 compares the amplitude $A_i$ thus detected to the associated thresholds $A_{i1}$ and $A_{i2}$.

If at least one amplitude $A_i$ is higher than at least one of the corresponding thresholds $A_{i1}$ or $A_{i2}$, the decision module 32 sends an alert signal to the control unit 9.

This alert signal depends on whether one or the two thresholds are overpassed.

If at least one amplitude $A_i$ is higher than the corresponding lower threshold $A_{i1}$ but lower than the higher threshold $A_{i2}$, in an alarm step 126, the decision module 32 generates an alarm signal, destined to trigger a reduction in the power of the generator 5, and sends the alarm signal to the control unit 9.

If no alarm signal was already received by the control unit 9 within a predetermined period preceding $t_a$, the control unit 9 then orders a reduction in the power of the generator 5 by partially closing the valve 10.

If at least one amplitude $A_i$ is higher than the corresponding higher threshold $A_{i2}$, the decision module 32, in a trip step 130, generates a trip signal destined to trigger a stopping of the steam turbine 3 and sends the trip signal to the control unit 9.

The control unit 9 then trips the steam turbine 3 by closing the valve 10.

The system and the method according to the invention thus provide a reliable detection of torsional oscillations occurring at any of the sub synchronous frequencies of the shaft line, which allows taking corrective actions in order to avoid shaft line damages which could result from these oscillations.

In particular, the direct measure of the rotational speed of the shaft line provides a reliable assessment of the torsional oscillations of the shaft line. Furthermore, this measure is available when the steam turbine is in use and therefore allows a permanent monitoring of the shaft line. This measure also requires only one point of measurement.

Moreover, since speed sensors are generally already used in steam turbines to monitor the synchronous frequency of the shaft line, the system and the method according to the invention can be implemented on these steam turbines without implying extra costs and without requiring any extra maintenance.

Moreover, the comparison of the amplitude of each torsional oscillation with two thresholds allows adapting the corrective action to the excess in amplitude of the torsional oscillations, so that stopping the steam turbine is generally not necessary.

It must be understood that the example embodiments presented above are not limiting.

According to other embodiments, the spectrum analysis is performed by means of spectrum analysis methods such as a Short Time Fourier Transform (STFT), Prony's method, a Hilbert transform, or by decomposing the signal in wavelets.

Furthermore, the spectrum analysis may also include post-treatments on the amplitudes obtained, for example scaling.

Moreover, the speed measurement device may comprise only one sensor, and the sensors used may be magnetic sensors other than Hall effect sensors, such as inductive sensors, or optical sensors.

Furthermore, according to one alternative, the toothed wheel is placed at the rear extremity of the shaft line.

According to another embodiment, each sub synchronous torsional resonance frequency is associated to more than two amplitude thresholds, and the decision module 32 is configured to generate and send an alert signal depending on which amplitude thresholds are overpassed.

For example, each sub synchronous torsional resonance frequency is associated to a third amplitude threshold $A_{i3}$, lower than the thresholds $A_{i1}$ or $A_{i2}$ mentioned above, and the decision module 32 is configured to generate a visual and/or sound alarm, without reducing the power of the generator 5, when an amplitude $A_i$ is higher than the third threshold but remains lower than the first and second thresholds.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for monitoring sub-synchronous torsional oscillations of a shaft line of a steam turbine, the method comprising:
    measuring a rotational speed of the shaft line over a period of time ($T_0$) and generating, from the measured rotational speed, a signal representative of the rotational speed over the period of time ($T_0$);
    performing a spectrum analysis on the signal to determine an amplitude ($A_i$) of variation of the rotational speed for at least one frequency ($fr_i$);
    comparing the amplitude (Ai) with at least two of predetermined amplitude thresholds ($A_{i1}$, $A_{i2}$) for the at least one frequency ($fr_i$), wherein the at least two of predetermined amplitude thresholds comprise a lower ($A_{i1}$) predetermined amplitude threshold and a higher ($A_{i2}$) predetermined amplitude threshold;
    generating an alert signal when the amplitude (Ai) is lower than the lower ($A_{i1}$) predetermined amplitude threshold and higher than the higher ($A_{i2}$) predetermined amplitude threshold for the at least one frequency ($fr_i$);
    receiving the alert signal at a control unit; and
    partially closing a valve by the control unit based on the alert signal for controlling an amount of steam supplied to the steam turbine, when the amplitude (Ai) is between the higher ($A_{i2}$) predetermined amplitude threshold and the lower ($A_{i1}$) predetermined amplitude threshold.

2. The method according to claim 1, further comprising:
    performing the spectrum analysis comprises determining, the amplitude ($A_i$) of variation of the rotational speed for each frequency of a plurality of frequencies ($fr_i$);
    comparing the amplitude ($A_i$) determined for each frequency of the plurality of frequencies ($fr_i$) with the at least one of predetermined amplitude thresholds ($A_{i1}$, $A_{i2}$) for each frequency of the plurality of frequencies ($fr_i$); and
    generating the alert signal when the amplitude ($A_i$) determined for a frequency ($fr_i$) of the plurality of frequencies ($fr_i$) exceeds the at least one of predetermined amplitude thresholds ($A_{i1}$, $A_{i2}$) for the frequency ($fr_i$).

3. The method according to claim 2, wherein each frequency of the plurality of frequencies ($fr_i$) is a sub-synchronous oscillation resonance frequency of the shaft line.

4. The method according to claim 2, wherein comparing the amplitude ($A_i$) determined for each frequency of the plurality of frequencies ($fr_i$) with the lower ($A_{i1}$) predetermined amplitude threshold and the higher ($A_{i2}$) predetermined amplitude threshold for each frequency of the plurality of frequencies ($fr_i$).

5. The method according to claim 4, wherein generating the alert signal of a first type when the amplitude ($A_i$) determined for a frequency ($fr_i$) of the plurality of frequencies ($fr_i$) is higher than the lower ($A_{i1}$) predetermined amplitude threshold and lower than the higher ($A_{i2}$) predetermined amplitude threshold for the frequency ($fr_i$).

6. The method according to claim 5, wherein the steam turbine rotates a generator, and wherein the method further comprises reducing power generated by the generator after the alert signal of the first type is generated.

7. The method according to claim 5, wherein generating the alert signal of a second type different from the alert signal of the first type when the amplitude ($A_i$) determined for a frequency ($fr_i$) of the plurality of frequencies ($fr_i$) is higher than the higher ($A_{i2}$) predetermined amplitude threshold for the frequency ($fr_i$).

8. The method according to claim 7, further comprising tripping of the steam turbine after the alert signal of the second type is generated.

9. The method according to claim 1, wherein measuring the rotational speed of the shaft line at a plurality of measurement times ($t_m$) over the period of time ($T_o$).

10. The method according to claim 9, wherein measuring, by a sensor, a mean rotational speed of the shaft line on a measurement period ($T_m$) preceding the plurality of measurement times ($t_m$).

11. The method according to claim 10, wherein measuring by the sensor comprises a detection of a movement of a toothed wheel mounted on the shaft line during the measurement period ($T_m$).

12. The method according to claim 10, wherein the sensor is a non-contact sensor.

13. The method according to claim 1, wherein performing the spectrum analysis comprises applying a Fast Fourier Transform (FFT) to the signal.

14. A system for monitoring sub-synchronous torsional oscillations of a shaft line of a steam turbine, the system comprising:
    a speed measurement device configured to measure a rotational speed of the shaft line over a period of time ($T_0$), and to generate, from the measured rotational speed, speed values forming a signal representative of the rotational speed over the period of time ($T_0$);
    an analysis unit configured to perform a spectrum analysis on the signal and to determine an amplitude (Ai) of variation of the rotational speed for the at least one frequency ($fr_i$), the analysis unit being further configured to compare the amplitude (Ai) with at least two of predetermined amplitude thresholds ($A_{i1}$, $A_{i2}$) for the at least one frequency ($fr_i$), wherein the at least two of predetermined amplitude thresholds comprise a lower ($A_{i1}$) predetermined amplitude threshold and a higher ($A_{i2}$) predetermined amplitude threshold and to generate an alert signal when the amplitude (Ai) is lower than the lower ($A_{i1}$) predetermined amplitude threshold and higher than the higher ($A_{i2}$) predetermined amplitude threshold; and a control unit on receiving the alert signal, partially closes a valve for controlling an amount of steam supplied to the steam turbine, when the amplitude (Ai) is between the higher ($A_{i2}$) predetermined amplitude threshold and the lower ($A_{i1}$) predetermined amplitude threshold.

15. The system according to claim 14, wherein the speed measurement device comprises at least one speed sensor.

* * * * *